A. WILSON.
Electric Gas Lighter.
No. 25,167.
Patented Aug. 16, 1859.
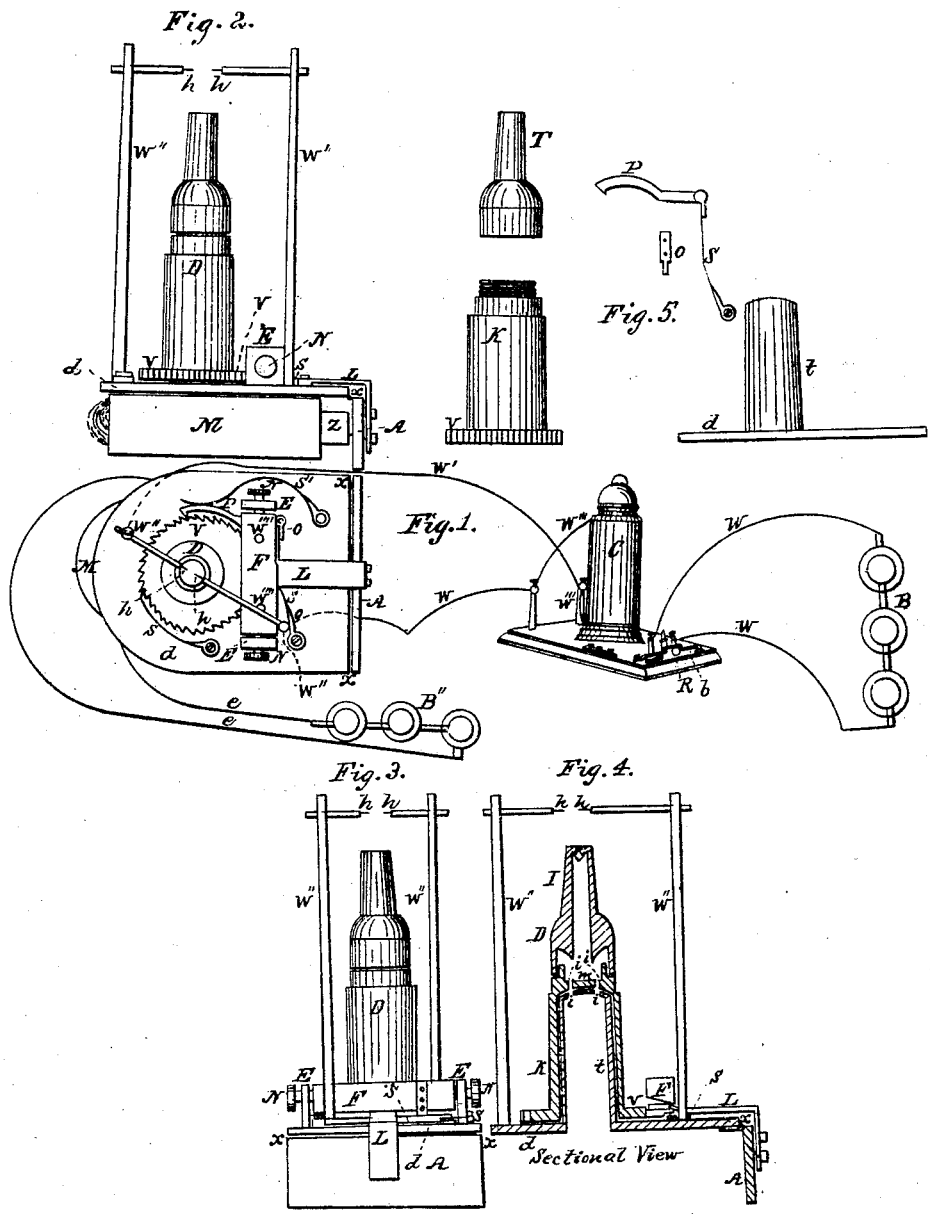

UNITED STATES PATENT OFFICE.

ARCHELAUS WILSON, OF NEW YORK, N. Y., ASSIGNOR TO D. A. HEALD, A. L. WILMARTH, C. T. MARTIN, AND H. A. HURLBURT.

IMPROVED MODE OF LIGHTING GAS BY ELECTRICITY.

Specification forming part of Letters Patent No. 25,167, dated August 16, 1859.

*To all whom it may concern:*

Be it known that I, ARCHELAUS WILSON, of the city, county, and State of New York, have invented certain new and useful Improvements in Apparatus for Lighting Gas and other Lamps by Means of Electricity or the Discharge from a Galvanic Battery, of which the following is a full, clear, and exact description, reference being had to the accompanying drawings, making part of this specification, in which—

Number 1 is a plan of my new apparatus and combination. No. 2 is a side elevation of the apparatus for lamps. No. 3 is a front elevation of the same. No. 4 is a vertical section of the same; No. 5, details to be referred to.

In all former efforts to light gas or other lamps by means of electricity, the gas, &c., being ignited by passing the electricity through the jet of gas, one of the main difficulties to be overcome has been, so far as I am informed, so to generate, control, and apply dynamical electricity, both in quantity and in intensity, as to bring the batteries or generators within practical or feasible limits, both as to space and expense. Another difficulty has been, where the current has been used for this purpose, so to gage or regulate the battery with reference to the size of the platinum wire to be heated and the length of the circuit through which the current is to be sent as always to secure the heating of the wire to a degree required for ignition and yet prevent its fusion. Still another difficulty has been, where a current of electricity is passed through a platinum wire for this purpose, a current of wind striking upon the wire is liable to reduce the temperature of the igniting-wire below the point which is requisite to produce ignition of the gas or other lamp.

The object of my improvements is to overcome these difficulties, in part, by removing the platinum wire altogether from the circuit, excepting so far as it may be found desirable or necessary to tip the ends of other conducting-wires with platinum, and to adopt what is called the "discharge" or "spark" obtained from an inductive apparatus for effecting ignition.

To enable others skilled in the art to understand and use my invention, I will proceed to describe the manner in which I have carried out the same.

In the different drawings the same letters indicate different views of the same parts.

In the drawings, B is a battery, connected by the wires W W with an inductive apparatus, C—in this case Ritchie's improved inductive apparatus, though I would not be understood as confining or limiting myself to the use of this one. This apparatus is again connected by the wires W''' W''', W'' W', and W' W'' with the platinum points $h\,h$, as seen in No. 1. The discharge from one point to another across a space at $h\,h$ is effected by opening and closing the circuit at the small wheel R, attached to the inductive apparatus C.

B'' is a second battery, connected by the wires $e\,e$ with the magnet M, No. 1, for operating the armature A and opening and shutting the gas-burner. M is a magnet fixed underneath the bed-piece $d$, with its poles Z approaching near the armature A. The armature A is attached to the bed-piece $d$ at $x$.

L is a lever attached to the armature A, and extending back under the part F, which is supported upon the pivot-points of the screws N N, fixed in the stands E E.

S is a spring connected with the pawl P, and lying underneath the lever L and part F. Attached to the part F is the small part O, Nos. 1, 3, 5, with its small end (seen in No. 5) extending down behind the spring S and made to act on the pawl P.

V is a ratchet-wheel, fixed to the part K of the burner, with which the pawl P engages.

S' S' are friction-springs acting upon the wheel V and the pawl P.

D is a gas-burner, made up of the several parts $f$ R T, No. 5, fitted to each other and shown together in sectional view, No. 4, with the holes $i\,i\,i\,i$, through which the gas issues in correspondence.

W'' W'' are carefully-insulated copper wires connected with the inductive apparatus C by other insulated wires, W' W'.

$h\,h$ are platinum points connected with the insulated wires W'' W'', and approaching each other over the tip of the burner D, as seen in Nos. 1, 2, 3, 4. W'' W'' are here represented as stationary.

W'''' W'''' represent positions which may be given to the insulated wires W'' W'', in connection with the part F, which, as F rotates, will give to those wires a vibratory motion. The burner D, with the various connecting parts, as seen in No. 2, is designed to take the place of ordinary gas burners and cocks.

Operation: When the circuit of the battery B'' is closed the magnet M is charged and attracts the armature A to its poles Z. This raises the lever L, which, by extending back under the part F, causes the part F to rotate upon the pivot-screws N N, throwing the upper part of F back toward the burner D. The part O being firmly fixed to F, as in No. 3, with its lower end extending down back of the spring S, as F rotates toward the burner D the lower end of O is thrown forward, carrying with it the spring S, which, being connected with the pawl P, thus causes the pawl P to engage with the ratchet-wheel V and turn it around one tooth each time the circuit is closed. This operation is repeated, turning the burner around one tooth each time, till the holes $i\ i\ i\ i$ in the parts of the burner are brought into correspondence, as seen in No. 4, when the gas issues. (These parts may be arranged so as to require this circuit to be closed any given number of times.) The gas-burner being now open, a discharge from battery B and apparatus C is effected through the jet of gas, from one point to the other, by turning the wheel R, which completes the circuit of the battery and inductive apparatus, and instantly the gas is ignited. To shut the gas off I have only to close the circuit of battery B'' a given number of times, till the holes $i\ i\ i\ i$ (seen in No. 4) are out of correspondence. The parts $f$ and K, No. 5, being ground together, when the holes $i\ i\ i\ i$ are out of correspondence the gas is shut off. As often as the circuit of the battery B'' is broken the armature A is relieved, and the spring S, acting upon the part O, brings the part F to its upright position, and at the same time carries the pawl P back into position to engage with the next tooth on the wheel V, when the circuit is again completed.

The points $h\ h$ may be made of any good conducting substance in the place of the platinum, though platinum may more completely resist corrosion by the action of the flame and the atmosphere upon the points; or the wires W'' W'' may be placed in connection with the part F at W'''' W'''', and made to vibrate backward and forward, so as to bring the points into the jet of gas for the discharge, in which arrangement points made of copper or other good conducting metal may be used, as by being removed out of the flame they will not be so liable to corrosion.

In the drawings two batteries are represented, one to operate the magnet to open and shut off the gas, the other, in connection with the inductive apparatus, for effecting the discharge and igniting the gas. It will be obvious that one and the same battery may be used for both of these purposes without departing from the principle of my invention.

I do not claim the inductive apparatus by itself as new; nor do I claim the magnet operated by a galvanic battery for opening and shutting off the gas by itself as new.

What I claim as my invention, and desire to secure by Letters Patent, is—

1. Combining, with a gas or other burner, metallic points, approaching but not coming in contact with each other, substantially as described, but this I only claim in combination with the inductive apparatus, substantially as described, for the purpose of effecting ignition by means of the electric discharge or spark, as specified.

2. Combining with a galvanic battery an inductive apparatus or coil, metallic points, and an electro-magnet, for the purposes specified, and substantially as herein described.

ARCHELAUS WILSON.

In presence of—
  I. H. WILSON,
  HORACE ANDREWS.